Oct. 21, 1930.  F. C. SEEHUSEN  1,779,264
PNEUMATIC FEEDER
Filed Aug. 5, 1926   3 Sheets-Sheet 2
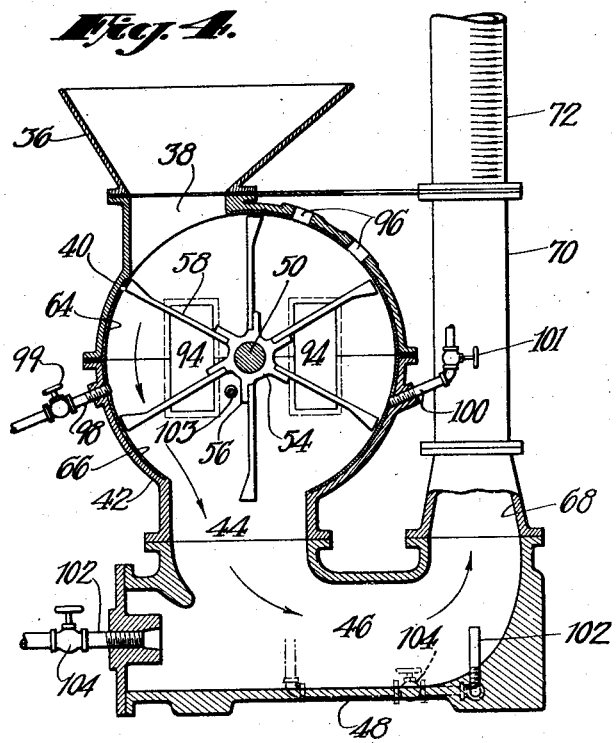
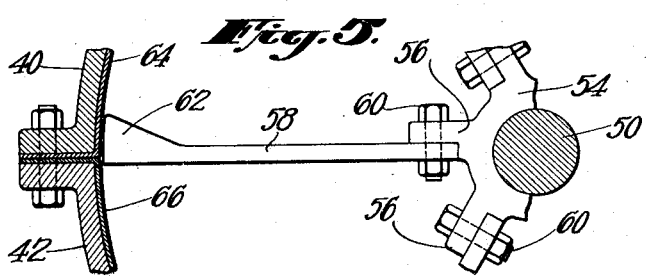
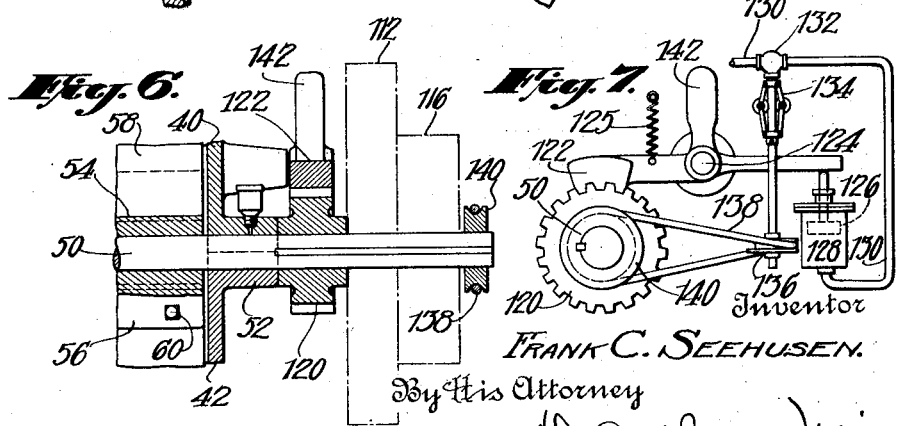
Inventor
FRANK C. SEEHUSEN.
By his Attorney

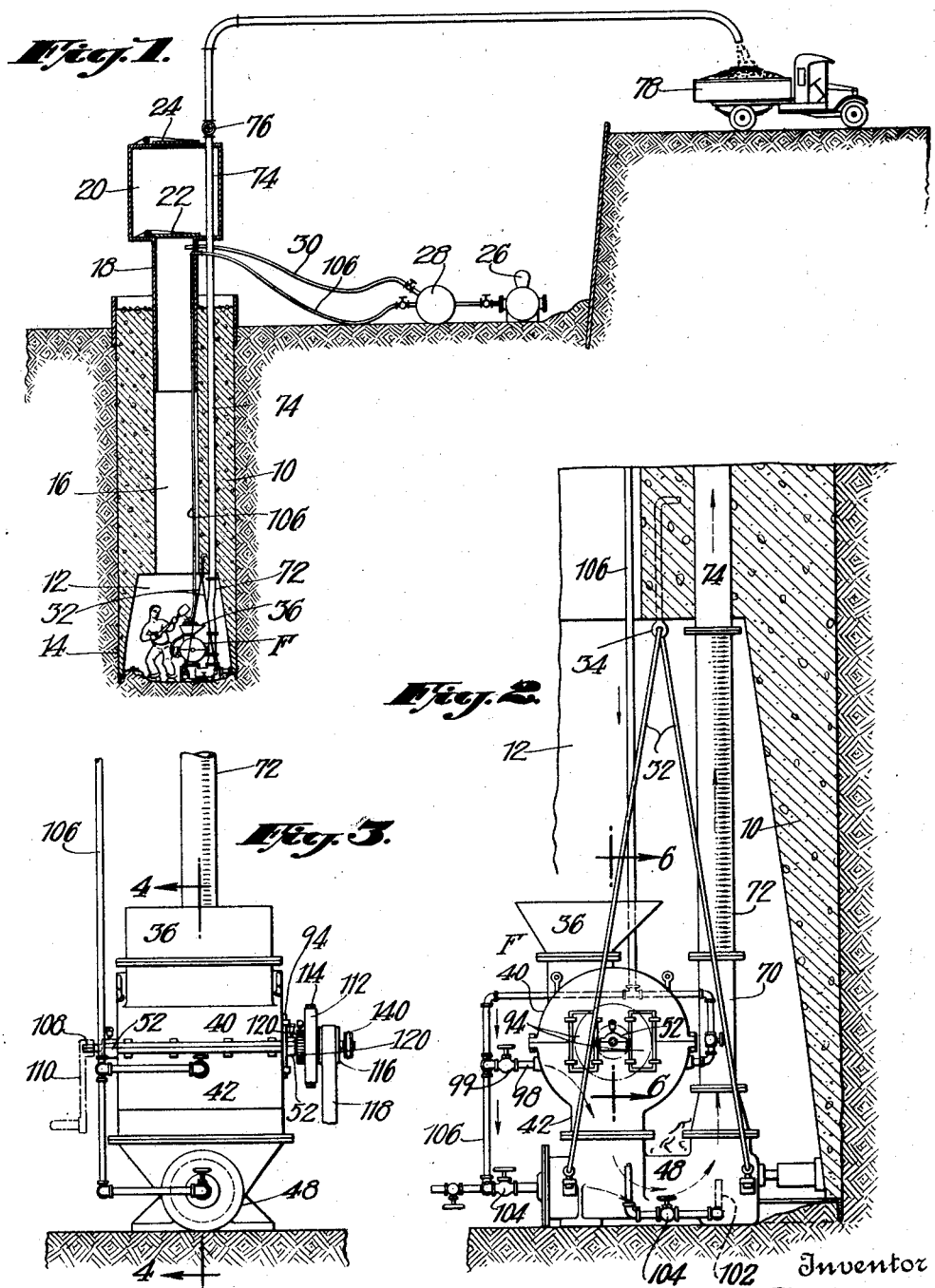

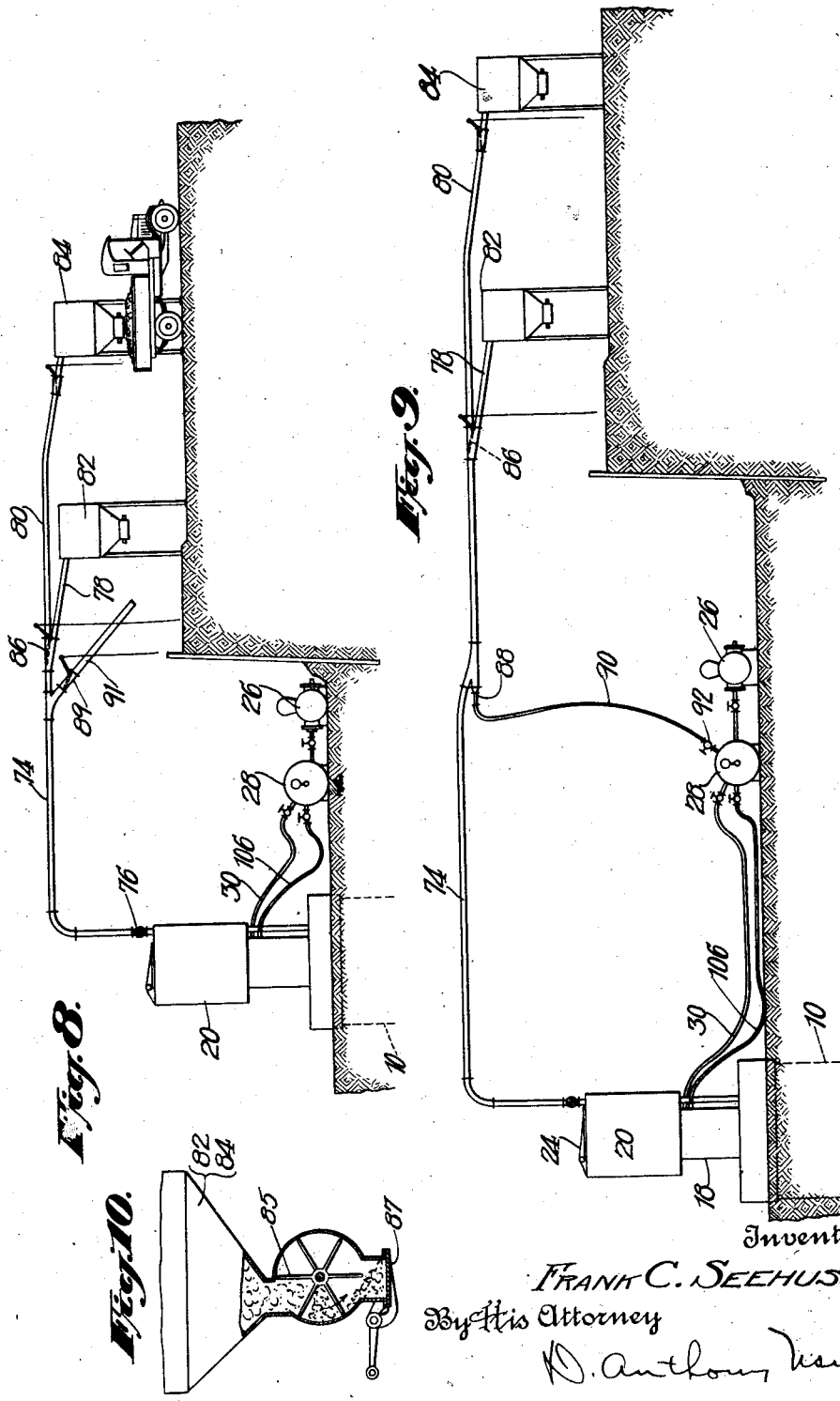

Patented Oct. 21, 1930

1,779,264

UNITED STATES PATENT OFFICE

FRANK C. SEEHUSEN, OF MAPLEWOOD, NEW JERSEY, ASSIGNOR TO THE FOUNDATION COMPANY, OF NEW YORK, N. Y., A CORPORATION OF NEW YORK

PNEUMATIC FEEDER

Application filed August 5, 1926. Serial No. 127,193.

This invention relates to an improved type of feeder adapted to discharge material from a working chamber in which a super-atmospheric pressure is normally maintained. While not limited thereto my improved feeder is particularly adapted for use in discharging excavated material from the working chamber of a caisson, coffer-dam or the like. The invention will be apparent from the following specification when read in connection with the accompanying drawings and the features of novelty will be pointed out with particularity in the appended claims.

In the drawings—

Fig. 1 is a longitudinal section on a small scale showing my improved feeder located in the working chamber of the caisson, the figure also illustrating diagrammatically a compressor, air storage tank and motor truck for disposing of the excavated material;

Fig. 2 is an enlarged view showing part of the lower end of the caisson having my improved feeder located in the working chamber thereof;

Fig. 3 is an elevation of the feeder viewed from the left of Fig. 2;

Fig. 4 is an enlarged longitudinal vertical section through the feeder;

Fig. 5 is a fragmentary view illustrating the details of construction;

Fig. 6 is a section on line 6—6 of Fig. 2;

Fig. 7 is a fragmentary detail illustrating means by which the feeder can be locked in case of emergency;

Figs. 8 and 9 are diagrams showing conduits for conveying the material from the feeder to remote points exterior of the caisson;

Fig. 10 is a detail section showing an air lock such as provided on the receiving bins of Figures 8 and 9.

Referring in detail to the drawings, 10 represents a caisson of usual construction having a working chamber 12 formed at the lower end thereof and the usual cutting edge 14. A central shaft 16 is formed in the caisson and at the upper part thereof is provided a cylindrical shell 18 having the usual air lock 20 which is provided with the usual trap doors 22 and 24 to permit entrance and exit of workmen without unduly depleting the air pressure within the working chamber. Located at any convenient point adjacent to the caisson is a suitable air compressor 26 and an air storage tank 28 which is connected by means of pipe 30 with a shell 18 so as to normally maintain a pressure of approximately 40 pounds per square inch within the working chamber.

Located within the working chamber of the caisson is my improved pneumatic feeder indicated as a whole at F. The feeder is suspended from the roof of the working chamber by means of cables 32 which are secured to suitable eye bolts 34 cast in or otherwise anchored to the caisson.

The feeder F is preferably, though not necessarily, made in sections. The uppermost section 36 is in the form of a hopper which is adapted to receive the excavated material and direct it toward the inlet port 38 of a housing section 40. The housing section 40 is bolted or otherwise secured to a similar section 42 having an outlet port 44 formed therein which delivers the material to a chamber 46 formed in the lowermost or base section 48. Located within the housing sections 40 and 42 is a rotary air lock feeder which includes a shaft 50 mounted in suitable bearings 52 secured to the end walls of the housing sections 40 and 42. The shaft 50 has keyed or otherwise secured thereto a hub 54 having a series of radial flanges 56 to which vanes 58 are detachably secured by means of bolts 60. The outer ends of the vanes are of increased thickness as indicated at 62 so as to make an effective air seal even though there is an appreciable amount of working clearance between the ends of the vanes and the interior of the chamber in which they rotate. The castings 40 and 42 are each provided with substantially cylindrical removable linings 64 and 66 which are adapted to be replaced from time to time.

The chamber 46 communicates through a reducer fitting 68 with a discharge conduit or pipe 70 which preferably includes a section 72 which is made of suitable flexible material such as rubber or canvas hose or armored flexible pipe. The upper portion 74 of the discharge conduit extends through the caisson and in fact the caisson is molded around this pipe as the work progresses. If desired, the conduit 74 may extend through the air lock of the caisson as shown in Fig. 1. Preferably, this pipe is provided with a control valve 76 which can be closed in case of emergency. The pipe 74 may discharge its contents directly into a motor-truck as indicated at 78. Or as indicated in Fig. 8 branches 78 and 80 may be provided which lead respectively to receiving bins 82 and 84 and the material may be routed to either bin by manipulating the flapper gate 86. Where the material is to be discharged at a point at a great distance from the caisson, the pressure in the pipe 74 may not be sufficient to carry the material to such remote point. As indicated in Fig. 9, I may provide a booster jet 88 which is connected by means of a pipe 90 with the air storage tank 28 a suitable valve 92 being provided for controlling the passage of air through this booster pipe. The bins 82 and 84 are preferably each provided with a rotary air lock feeder such as indicated at 85 which is adapted to prevent rapidly depleting the pressure in the discharge conduit 74. The lower end of the feeder is provided with a suitable pivoted discharge gate 87. In some cases, if desired, however, material may be discharged directly to atmosphere by opening valve 89 of the branch pipe 91.

As shown in Figs. 2 and 4, the feeder is provided with trouble doors 94 which are normally secured in closed position but which are adapted to give access to the spaces between any of the vanes in the event that the feeder becomes jammed with rocks or other foreign matter. A pair of ports 96 are formed in the casing 40 and these permit the entrance of air at caisson pressure to the side of the feeder opposite the inlet port 38 which tends to balance the pressure and prevent the vanes from rotating at too high rate of speed under influence of the pressure admitted through the large charging port 38. I also provide equalizing pipes 98 and 100 having valves 99 and 101 therein by which controlled amounts of air can be admitted to points on opposite sides of the casing so as to control the speed of rotation of the vanes. A jet 103 is provided to free the rotary feeder if it becomes clogged.

For forcing the excavated material from the chamber 46 through the discharge conduit, I provide pipes or nozzles 102 from which an auxiliary jet of air can be discharged, these pipes being provided with suitable control valves 104.

If desired, the pipes 98, 100 and 102 may all receive their air pressure directly from the caisson. But I prefer to connect them to an independent supply pipe indicated at 106 which leads to the compressed air tank 28.

One end of the rotary feeder shaft 50 is squared off as indicated at 108 so as to receive a handle or wrench 110 by which the same may be rocked by hand if the machine jams. I also preferably provide a brake drum 112 and brake band 114 so as to control the speed at which the vanes rotate. If desired, I may also provide a pulley 116 on the shaft 50 so that the feeder can be turned mechanically by connecting said pulley by means of a suitable belt 118 with a suitable air or electric motor.

The shaft 50 also carries a square tooth ratchet 120 which is adapted to co-act with a dog 122 pivoted at 124. The dog 122 is normally held out of engagement with the ratchet by a spring 125. In case of emergency the dog is adapted to be moved to the locking position shown in Fig. 7 by means of a piston 126 working within the air cylinder 128, this cylinder being connected by means of pipe 130 with the air supply pipe 106. The supply of pressure to piston 128 is controlled by a valve 132 and this valve is automatically opened when the speed of rotation of the vanes reaches a dangerous rate. This automatic control is accomplished by providing a fly ball governor 134 having a pulley 136 which is connected by means of a belt 138 with a suitable pulley 140 carried on the shaft 50. The dog 122 may also be manually operated by a workman grasping the handle 142.

In operation, the so-called sand-hogs or workmen doing the excavating in the working chamber, shovel the sand, rock and earth into the hopper 36. The port 38 being at one side of the center of the shaft 50 enables the weight of the load to exert a turning movement on the vanes. This turning movement is augmented by the air pressure in the caisson and all tends to carry the load toward the outlet port 44. Caisson pressure may, if desired, be admitted through the pipe 102 so as to force the material through the discharge conduit 70 either directly to truck 78 or to discharge bins such as indicated at 82 and 84 in Figs. 8 and 9. Preferably, however, auxiliary pressure is admitted to the pipe 102 from the independent air supply pipe 106. The use of this auxiliary air supply is preferable as it lessens the hazard to the workmen in the caisson. It is apparent that when there is no load in the feeder that if the pressure on the right and left sides of the center of the rotor as viewed in Fig. 4 were not balanced, the tendency of the caisson pressure on the same entering through the hopper port 38 would be to turn the vanes at a high rate of speed. But this tendency can be overcome in part by the provision of ports 96 as shown in Fig. 4 or by the admission of air through pipe 100 under control of valve 101. The ports 96 may be omitted in which case too rapid rotation of the vanes 58 with a consequent depletion of caisson pressure can be prevented by admitting a counteracting air pressure through the pipe 100 under control of the valve 101. In the event of neglect of workmen to manipulate the valve 101 or upon the admission of too much air through pipe 98, rapid depletion of air in the working chamber can be prevented by operating the hand brake. If workmen neglect to do this, the governor 134 will admit air through valve 130 and throw the locking dog 122 in a position to stop the rotation of the vanes. The flexible pipe section 72 is provided for the purpose of relieving the feeding apparatus from any strains occasioned by the caisson moving rapidly downward relatively to the feeder. It is known to those skilled in the art that frequently the caisson will move downward with a jerky motion. In such case, a rigid pipe would be apt to injure the mechanism or spring an air leak.

In normal operation the rotation of the vanes permits the material to be intermittently discharged without dangerously depleting the air pressure within the working chamber. The apparatus provides an efficient air locked rotary feeder which increases the safety of workmen engaged in excavating in working chambers in which an air pressure must be maintained in order to hold back quick sand or mud such as encountered in subterranean work.

Though I have described with great particularity certain specific embodiments of the invention herein illustrated, it is not to be construed that I am limited thereto since changes in arrangement and substitution of equivalents may be made by those skilled in the art without departing from the invention as defined in the appended claims.

What I claim is:—

1. The combination with a caisson having a working chamber in which a super-atmospheric pressure is maintained, of a pneumatic feeder supported by the caisson for discharging excavated material having a rotary air lock adapted to prevent a rapid depletion of the pressure in said working chamber as the material is discharged and a discharge conduit extending to a point outside the caisson connected with said feeder and having a flexible section adapted to yield when the caisson moves downward relatively to said feeder.

2. A pneumatic feeder adapted to be supported by a caisson for discharging material from a working chamber in which a super-atmospheric pressure is maintained comprising a housing having an inlet port, an outlet port and a pneumatically actuated rotary discharge member, a discharge conduit communicating with said outlet port, said conduit having a flexible section which is adapted to yield to relieve the feeder from external strains.

3. The combination with a caisson having a working chamber in which a super-atmospheric pressure is maintained, of a pneumatic feeder for discharging excavated material said feeder having a rotary air lock adapted to prevent a rapid depletion of the pressure in said working chamber as the material is discharged, means for suspending the feeder from the caisson and a discharge conduit having a flexible section between said feeder and the roof of said working chamber.

In witness whereof, I have hereunto signed my name.

FRANK C. SEEHUSEN.